Patented Feb. 16, 1943

2,311,249

UNITED STATES PATENT OFFICE 2,311,249

COMPOSITION OF MIXTURES OF VINYL AND ACRYLATE RESINS

George M. Powell, III, Charleston, W. Va., assignor to Carbide and Carbon Chemicals Corporation, a corporation of New York No Drawing. Application February 11, 1939, Serial No. 255,985

8 Claims. (Cl. 260—32)

This invention is concerned with improvements in vinyl resin coatings, and it more particularly relates to such improvements as may be brought about by combining vinyl resins with certain polymeric esters of acrylic or methacrylic acids.

The vinyl resins to which this invention is directed are those resins which may result from the conjoint polymerization of vinyl halides with vinyl esters of aliphatic acids. An outstanding example of such a resin is one formed from the conjoint polymerization of vinyl chloride with vinyl acetate, and containing about 87% vinyl chloride in the polymer. The application of these resins in coatings and lacquers is promoted by a variety of useful properties which these resins possess, such as their strength and toughness, their chemical resistance and inertness, their high degree of resistance to water, as well as their lack of odor and inflammability. These excellent properties are detracted from to some extent by other qualities inherent in the resin, for example, incomplete resistance to light and heat, and the necessity of baking a vinyl resin finish at rather high temperatures to secure good adhesion to metals. In addition, films derived from vinyl resin lacquers containing certain pigments, notably white, such as titanium dioxide or white lead, show a definite tendency toward chalking on prolonged exterior exposure. Chalking is a defect whereby the coated surface becomes dull and lifeless because of a gradual superficial disintegration or weathering of the surface of the protective film under the action of intense solar radiation.

Likewise, the polymeric esters of the acrylic and methacrylic acids are known and have been suggested as bases for lacquers and enamels. However, solutions of these resins of viscosities suitable for application to a surface by means of spraying cannot be successfully sprayed because the resin has a distinct tendency to coagulate in filaments or to "cobweb," as this phenomenon is commonly referred to in the coating art. Moreover, these polymeric esters are characterized by a comparative weakness in film strength. In distinction to these undesirable properties, these resins are considered highly resistant to heat and light.

It has now been found that, by a proper combination of the aforesaid vinyl resins with the polymeric esters of the acrylic or methacrylic acids, the above-mentioned defects of these resins can be ameliorated. It has been observed that these resins are compatible with each other at least in the range of compositions comprising one part of vinyl resin and nine parts of acrylate or methacrylate resin to compositions comprising nine parts of vinyl resin and one part of acrylate or methacrylate resin. Within these limits, the resins are known to be compatible, that is, a clear film is deposited from solutions of the resins.

However, the aforesaid improvements are not all obtained when the resins are combined in all such proportions, but only in those compositions wherein the acrylate or methacrylate resin constitutes at least about 10% of the total resin content but not substantially more than 25% of the total resin content. A preferred range is from 10% to about 15% of the total resin content.

Combinations of acrylate or methacrylate resins with vinyl resins coming within the above limits are characterized by freedom from objectionable "cobwebbing" when their solutions are sprayed; by improved resistance to light and heat; and by good adhesion to metals. Furthermore, the film strength of the composition is superior to that of the acrylate or methacrylate resin alone. Compositions greatly exceeding the upper limit of acrylate or methacrylate resin content indicated above, are characterized by excessive "cobwebbing" on spraying their solutions as well as by a noticeable decrease in the chemical resistance, water resistance, flexibility, and mechanical strength of the film.

Compositions containing more of the modifying acrylate or methacrylate resin than is indicated by the limits above have superior resistance to heat and light but other objectionable characteristics of such compositions render them unsuitable for use as lacquer coatings.

The properties of the combination are at an optimum when a vinyl resin comprising a conjoint polymer of vinyl chloride with vinyl acetate containing 87% vinyl chloride in the polymer and having an average macromolecular weight of about 10,000 to 12,000 is combined with a commercial grade of polymethyl α-methacrylate (having an average macromolecular weight of about 17,000 to 20,000) in compositions in which the polymethyl α-methacrylate amounts to from about 10% to about 15% of the total resin content. The macromolecular weights were determined by Staudinger's method from the viscosity of dilute solutions of the resin.

It has also been found that chalking of the finish can be substantially prevented if a pigment which normally induces chalking is first ground and dispersed in the acrylate or methacrylate resin before combining this resin with the vinyl resin. Combinations in which the pigment is initially dispersed in the vinyl resin exhibit no improvement in their resistance to chalking. It has been observed likewise, that combinations containing the pigment dispersed initially in polymethyl methacrylate exhibit the best resistance to chalking of the combinations of vinyl resin with the various polymerized esters of acrylic or methacrylic acid.

The following examples will illustrate more clearly the practice of the invention:

The vinyl resin used in the following experiments was a conjoint polymer of vinyl chloride with vinyl acetate having about 87% vinyl chloride in the polymer and having an average macromolecular weight of about 11,500.

*Example 1*

The following compositions were prepared.

*Sample A.*—Titanium dioxide pigment was milled into a commercial grade polymethyl methacrylate polymer on a differential speed roll mill. After the pigment was well dispersed, the homogeneous sheet was taken off the mill and dissolved in an appropriate solvent. The vinyl resin was added in solution form to this pigment paste and the appropriate amount of plasticizer added.

*Sample B.*—Titanium dioxide pigment was milled into a part of the vinyl resin on a roll mill. The homogeneous sheet was broken up and dissolved in appropriate solvents to form a pigment paste. Additional vinyl resin and some polymethyl methacrylate resin, both in granular form, were dissolved separately in appropriate solvents and these solutions were added to the pigment paste.

The ultimate composition of Samples A and B by weight was identical and was as follows:

| | Parts |
|---|---|
| Polymethyl methacrylate resin | 2.1 |
| Vinyl resin | 12.1 |
| Titanium dioxide pigment | 8.1 |
| Di-(ethylene glycol monobutyl ether) phthalate | 1.0 |
| Blown castor oil | 0.1 |
| Ketone and aromatic hydrocarbon thinner | 75.7 |

*Sample C.*—This sample was prepared in the same manner as Sample B, with the exception that the ratio of vinyl resin to polymethyl methacrylate resin was 3 to 1. The ultimate composition of this sample was:

| | Parts |
|---|---|
| Polymethyl methacrylate resin | 3.5 |
| Vinyl resin | 10.5 |
| Titanium dioxide pigment | 8.1 |
| Di-(ethylene glycol monobutyl ether) phthalate | 1.0 |
| Blown castor oil | 0.1 |
| Ketone and aromatic hydrocarbon thinner | 75.7 |

*Sample D.*—This sample was prepared in the same manner as Sample B, with the exception that no methyl methacrylate resin was used. The ultimate composition of the sample was:

| | Parts |
|---|---|
| Vinyl resin | 14.2 |
| Titanium dioxide pigment | 8.1 |
| Di-(ethylene glycol monobutyl ether) phthalate | 1.0 |
| Blown castor oil | 0.1 |
| Ketone and aromatic hydrocarbon thinner | 75.7 |

Two coats of each of these lacquer finishes, thinned to spraying viscosity, were applied by spraying to steel panels over a baked vinyl resin primer coat. It is significant that none of these lacquers showed any objectionable tendency to string or "cobweb" when sprayed, with the exception of Sample C. This sample contained the greatest amount of polymethyl methacrylate resin and displayed more tendency to "cobweb" than the other samples, but it could still be sprayed satisfactorily upon dilution. Sample C represents about the maximum amount of this particular grade of polymethyl methacrylate which can be used in conjunction with the vinyl resins without encountering serious difficulty in spraying. However, if lower molecular weight vinyl resin or polymethyl methacrylate resin were used, this proportion may be increased somewhat.

The coated panels were baked for thirty minutes at 280° F. They were then exposed to the atmosphere for six months at 45° to horizontal facing south at South Charleston, West Virginia.

At the end of six months' exposure it was noted that Sample A was the only finish which showed no failure by chalking. On the other finishes the chalking was severe. This indicates the advantages of initially grinding those pigments which induce chalking in the methyl methacrylate polymer. The manner of dispersing those pigments which do not induce chalking of the finish is, of course, immaterial. However, in this latter case, it is still equally important to use only the proportions specified of the polymethyl methacrylate or other acrylate resin in the finish in order to secure the other desirable properties enumerated above.

*Example 2*

This example further demonstrates the importance of initial dispersion of pigments inducing chalking in the acrylate or methacrylate resins.

The values in the following table indicate the resistance to chalking of resin compositions substantially identical to Samples A and B when subjected to South Florida exposure at 45° to horizontal. The rating below was visual and is on the basis of 10=no chalking, 8=slight chalking, 6=considerable chalking, 4=bad chalking, 2=very bad chalking.

| | Sample A—pigment ground in polymethyl methacrylate resin | Sample B—pigment ground in vinyl resin |
|---|---|---|
| 4 weeks | 10 | 10 |
| 6 weeks | 10 | 6 |
| 10 weeks | 10 | 4 |
| 14 weeks | 9 | 3 |
| 20 weeks | 8 | 3 |

Improvement in the chalking resistance of the finish was noted when other acrylate resins were employed in a like manner, although the improvement was not so marked. Among the resins tested were included n-butyl methacrylate polymer, isobutyl methacrylate polymer, and products known by the trade names, "Acryloid A" and "Acryloid B," which are believed to contain mixtures of methyl and ethyl acrylate polymers.

Modifications of the invention other than as described in the foregoing examples will be readily apparent to those versed in the art of making coatings from artificial resins and such modifications are intended to be included within the scope of the invention as defined by the appended claims.

I claim:

1. A coating composition characterized by its adherence to metals, its resistance to light and heat and by its ability to be sprayed from solutions thereof without stringing, comprising a conjoint polymer of a vinyl halide with a vinyl ester of a lower aliphatic acid combined with a polymerized lower fatty alcohol ester of one of the group consisting of acrylic and methacrylic acids, said polymerized lower fatty alcohol ester being present in amounts from about 10% to about 25% by weight of the total resin content of said coating composition.

2. A coating composition characterized by its adherence to metals, its resistance to light and heat and by its ability to be sprayed from solutions thereof without stringing, comprising a conjoint polymer of vinyl chloride with vinyl acetate combined with polymerized methyl methacrylate resin, said polymerized methyl methacrylate resin being present in amounts from about 10% to about 25% by weight of the total resin content of the coating composition.

3. A lacquer sprayable without stringing comprising a solution in an organic solvent of a vinyl resin and a polymerized lower fatty alcohol ester of one of the group consisting of acrylic and methacrylic acids, said vinyl resin being a conjoint polymer of vinyl chloride with vinyl acetate, and said polymerized lower fatty alcohol ester being present in amounts from about 10% to about 25% by weight of the total resin content of the lacquer.

4. A lacquer comprising a solution in an organic solvent of polymerized methyl methacrylate resin and of a conjoint polymer of vinyl chloride with vinyl acetate, said polymerized methyl methacrylate resin being present in amounts from about 10% to about 25% by weight of the total resin content of the lacquer, and said lacquer being sprayable without stringing.

5. Process for making a coating composition unusually resistant to chalking on application of a film thereof to an exposed surface, which comprises initially dispersing a white pigment into a polymerized lower fatty alcohol ester of one of the group consisting of acrylic and methacrylic acids, and thereafter combining the pigmented dispersion with a conjoint polymer of vinyl chloride with vinyl acetate, said polymerized lower fatty alcohol ester being present in amounts from about 10% to about 25% by weight of the total resin content of the coating composition.

6. Process for making a coating composition unusually resistant to chalking on application of a film thereof to an exposed surface, which comprises initially dispersing a white pigment in polymerized methyl methacrylate resin, and thereafter combining the pigment dispersion thus formed with a conjoint polymer of vinyl chloride with vinyl acetate, said methyl methacrylate resin being present in amounts from about 10% to about 25% by weight of the total resin content of the coating composition.

7. An article having a coating resistant to chalking on exposure thereof comprising, in combination, a conjoint polymer of vinyl chloride with vinyl acetate, a polymerized lower fatty alcohol ester of an organic acid of the group consisting of acrylic and methacrylic acids, and a white pigment; the chalking tendencies of said pigment having been substantially neutralized by its being initially ground into said polymerized lower fatty alcohol ester, and said polymerized lower fatty alcohol ester being present in amounts from about 10% to about 25% by weight of the total resin content of the coating.

8. A coating composition unusually resistant to chalking on application of a film thereof to an exposed surface, comprising in combination a conjoint polymer of vinyl chloride with vinyl acetate, a polymerized methyl methacrylate resin, and a white pigment, the chalking tendencies of said pigment having been substantially neutralized by its being initially ground into said polymerized methyl methacrylate resin, and said polymerized methyl methacrylate resin being present in amounts from about 10% to about 25% by weight of the total resin content of the coating composition.

GEORGE M. POWELL, III.